United States Patent [19]

Frankish et al.

[11] Patent Number: 4,985,889

[45] Date of Patent: Jan. 15, 1991

[54] DATA PACKET SWITCHING

[75] Inventors: Anthony J. Frankish; Ian B. Stewart; John A. Stockdale, all of Poole, England

[73] Assignee: Sprint International Communications Corporation, Reston, Va.

[21] Appl. No.: 305,087

[22] Filed: Feb. 2, 1989

[30] Foreign Application Priority Data

Feb. 4, 1988 [GB] United Kingdom ................ 8802533

[51] Int. Cl.[5] ........................ H04J 3/24; H04Q 11/04

[52] U.S. Cl. .................................... 370/94.1; 370/60

[58] Field of Search .................... 370/60, 94.1, 85.12, 370/85.15, 94.3, 85.1, 54, 85.9

[56] References Cited

U.S. PATENT DOCUMENTS

| | | | |
|---|---|---|---|
| 3,794,983 | 2/1974 | Sahin | 370/54 |
| 4,672,373 | 6/1987 | Mori et al. | 370/85.12 |
| 4,736,465 | 4/1988 | Bobey et al. | 370/85.12 |
| 4,742,511 | 5/1988 | Johnson | 370/85.9 |
| 4,797,882 | 1/1989 | Maxemchuk | 370/94.1 |
| 4,894,822 | 1/1990 | Buhrke et al. | 370/60 |

*Primary Examiner*—Douglas W. Olms
*Assistant Examiner*—Wellington Chin
*Attorney, Agent, or Firm*—Leitner, Greene & Christensen

[57] ABSTRACT

A technique for interconnecting line processing units (LPUs) of a packet switch and/or data concentrator system in which, instead of using a standard bus system, each LPU has a number of duplex point to point serial links that are connected in either a random or structured manner to provide a network of routes between the LPUs. Information is then transferred between source and destination LPUs as short packets. When the system is expanded by adding more LPUs, the network of serial point to point links expands to provide more routes and, hence, greater bandwidth to handle the increased information flow. Failure of a link in the network is not catastrophic as there are a number of different routes to any LPU and the system only degrades systematically in the event of link failures.

5 Claims, 14 Drawing Sheets

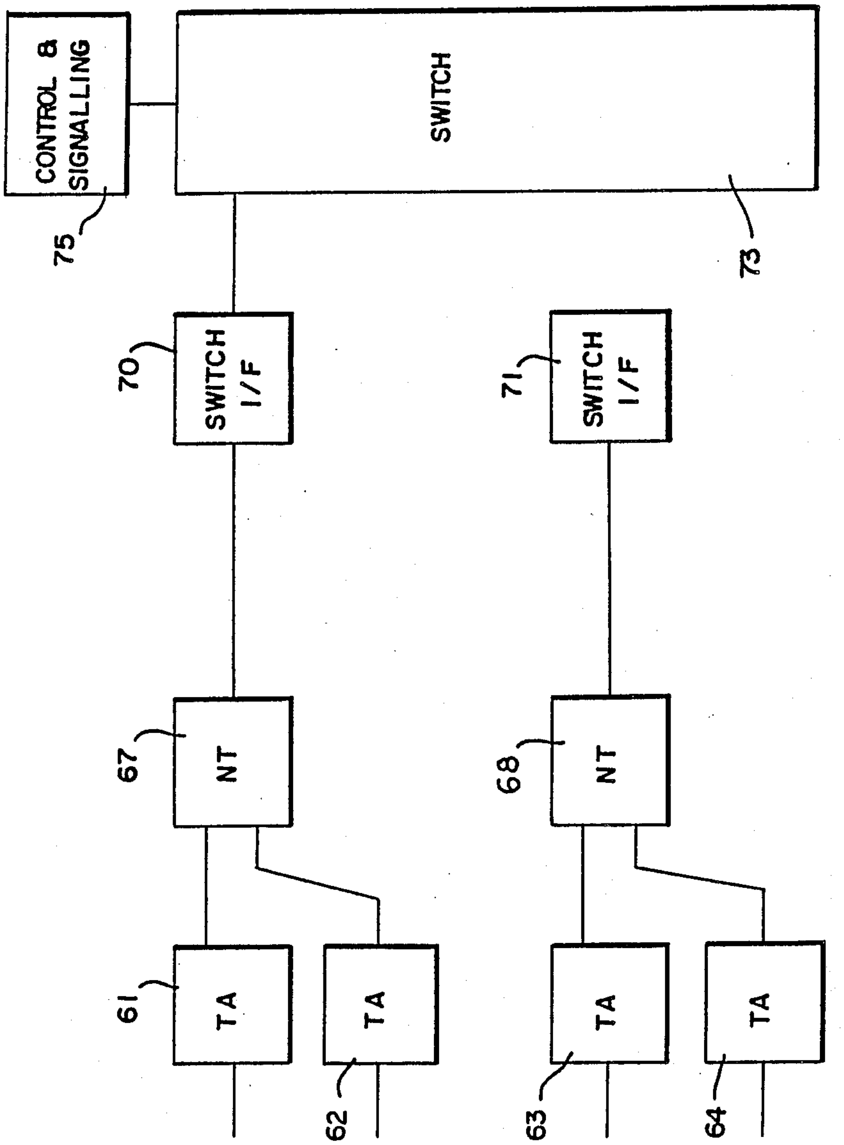
FIG. 3.1

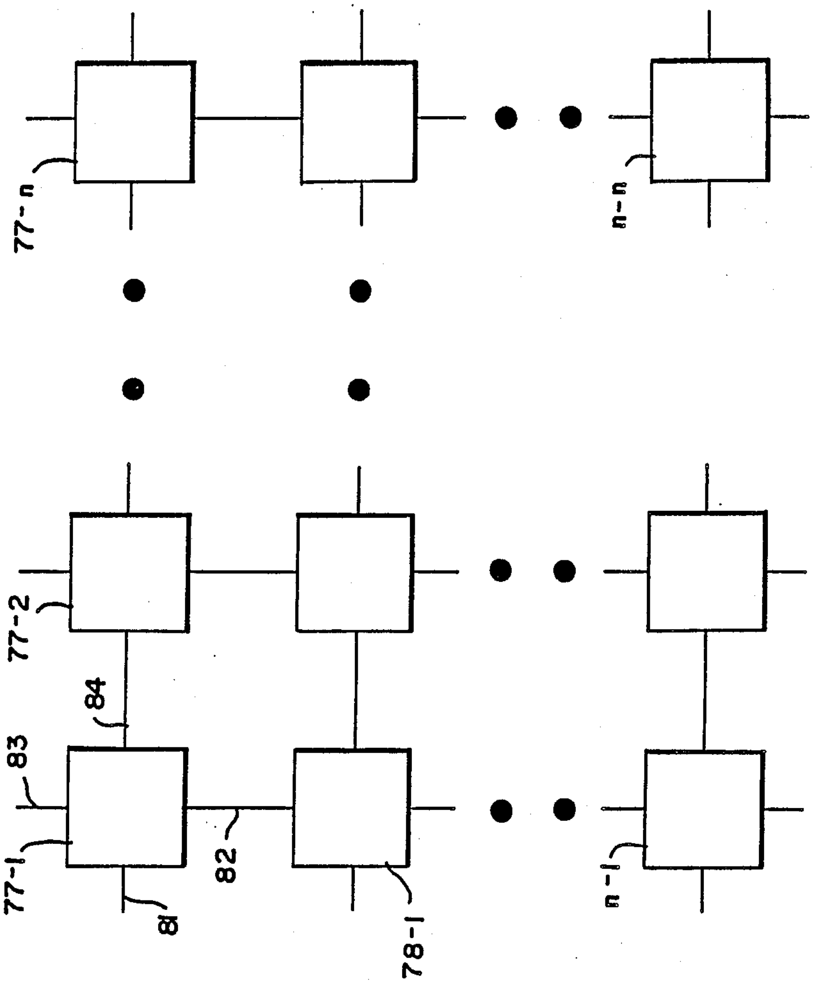
FIG. 3.2

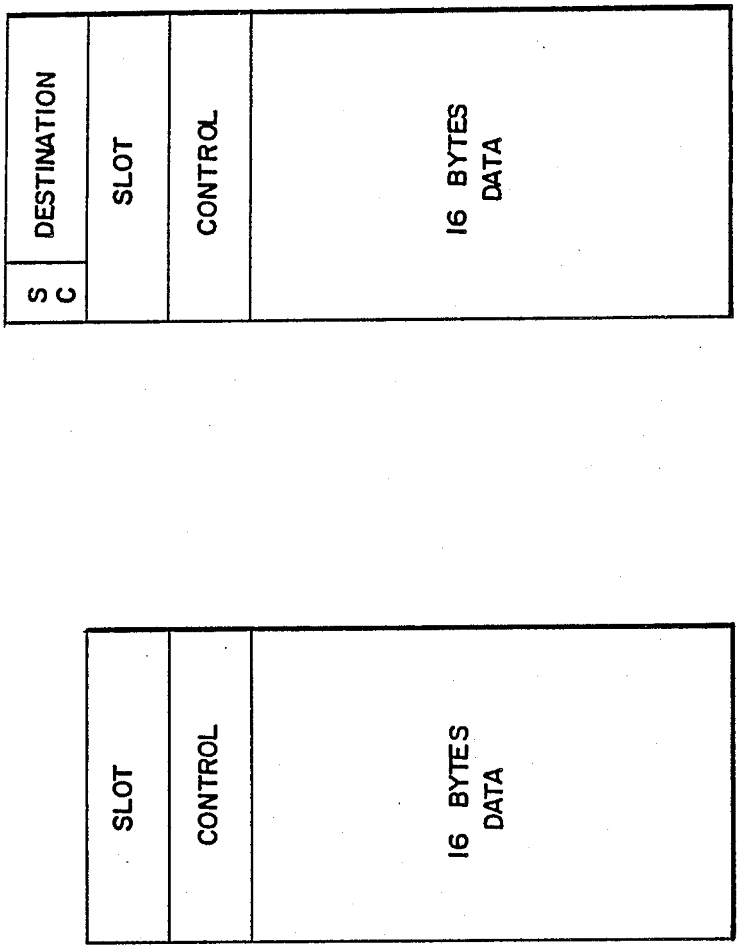
FIG. 3.3

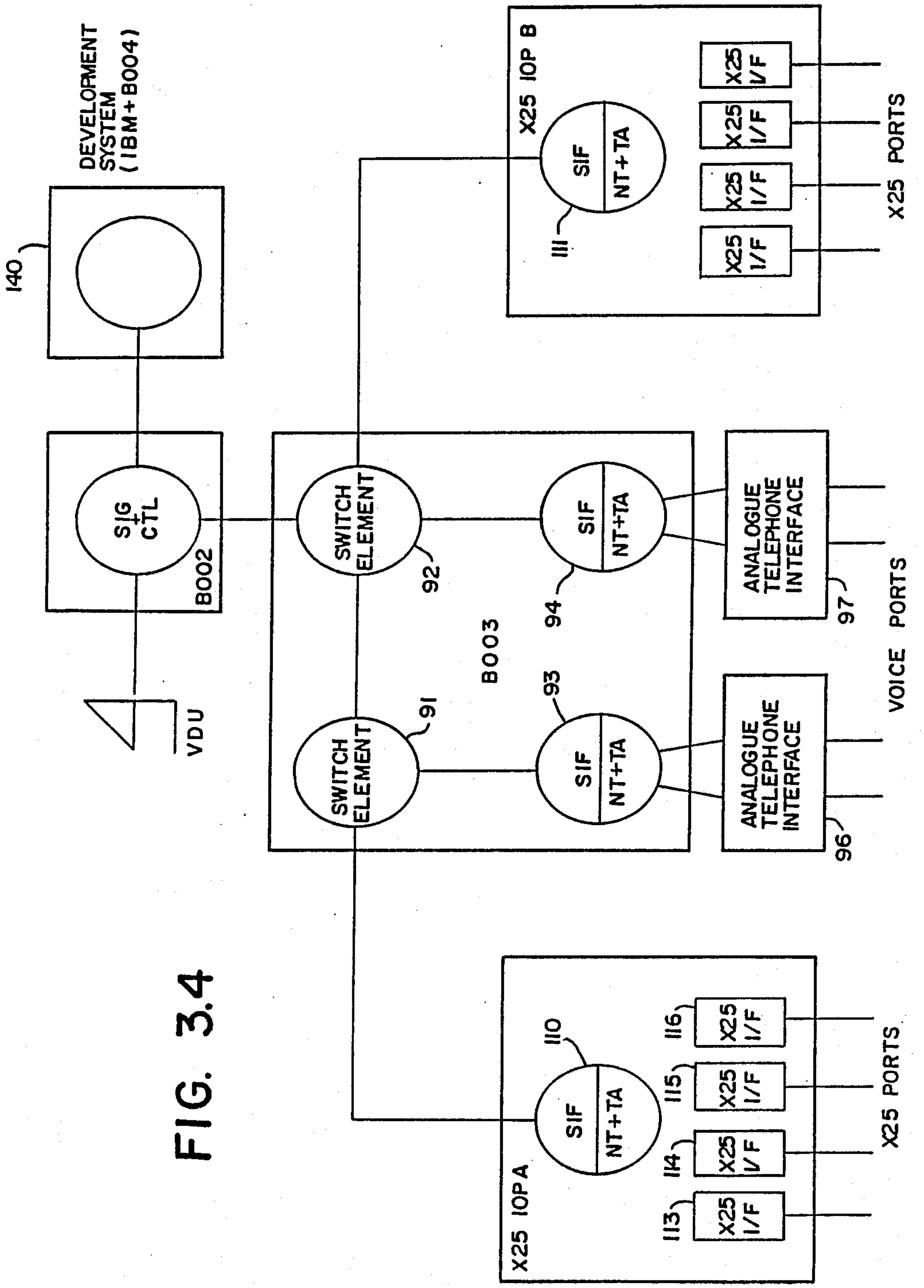
FIG. 3.4

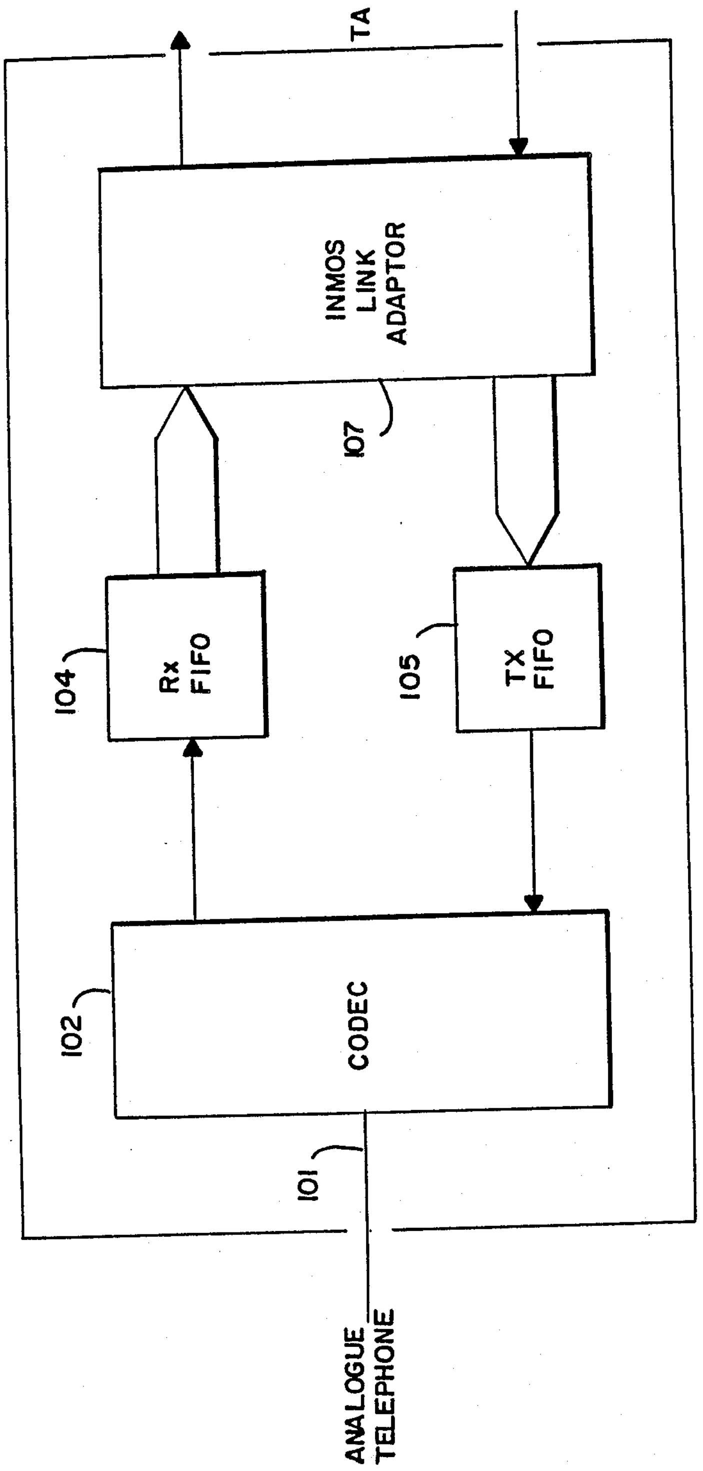
FIG. 3.5

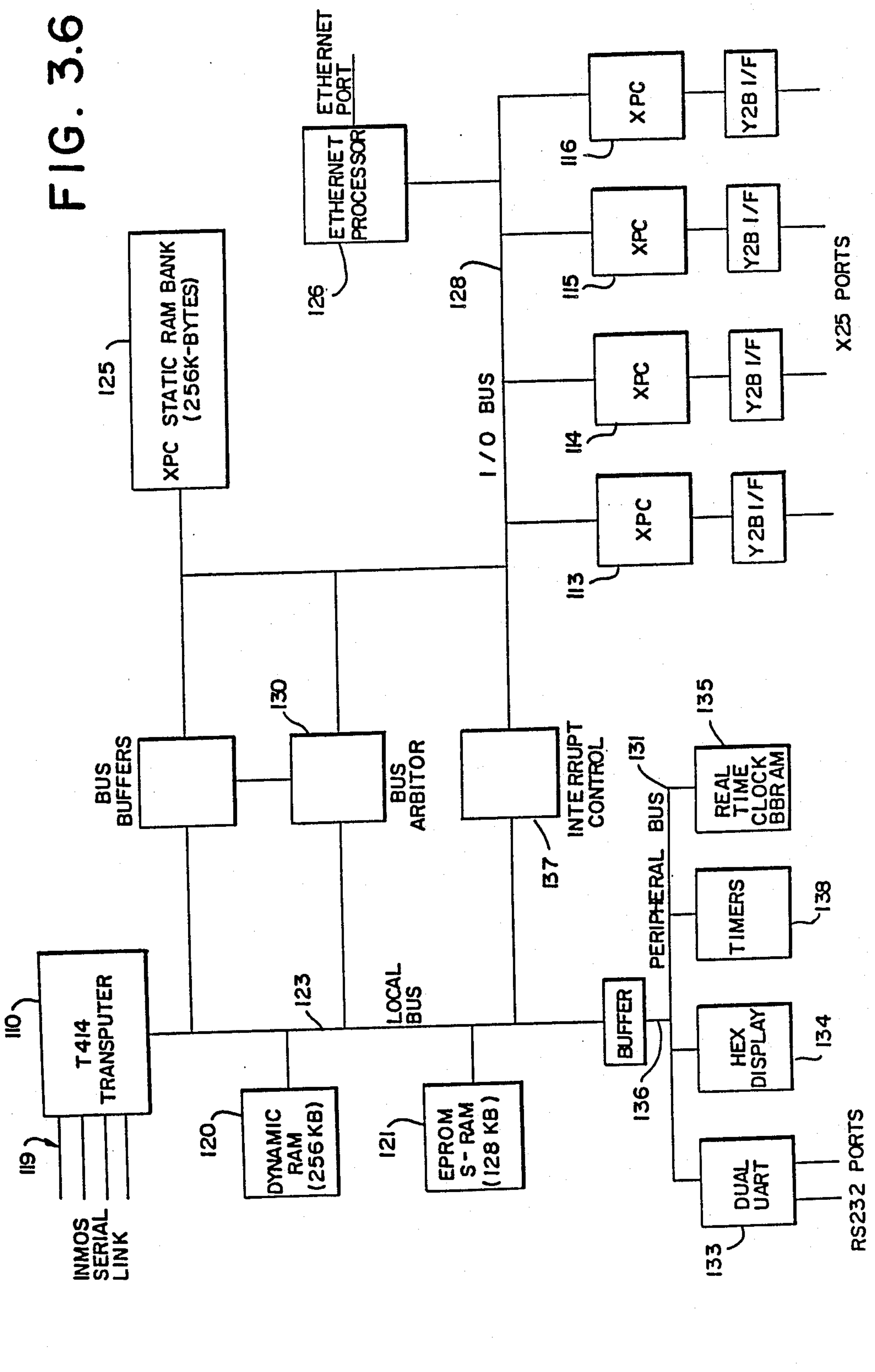
FIG. 3.6

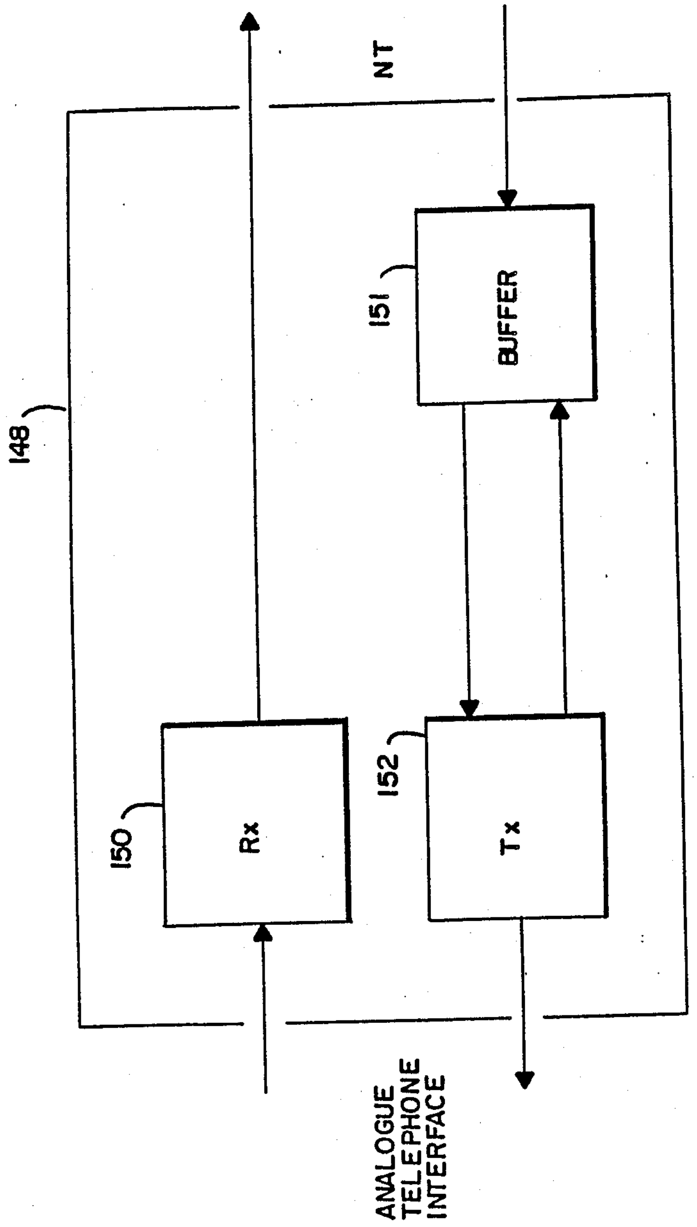
FIG. 3.7

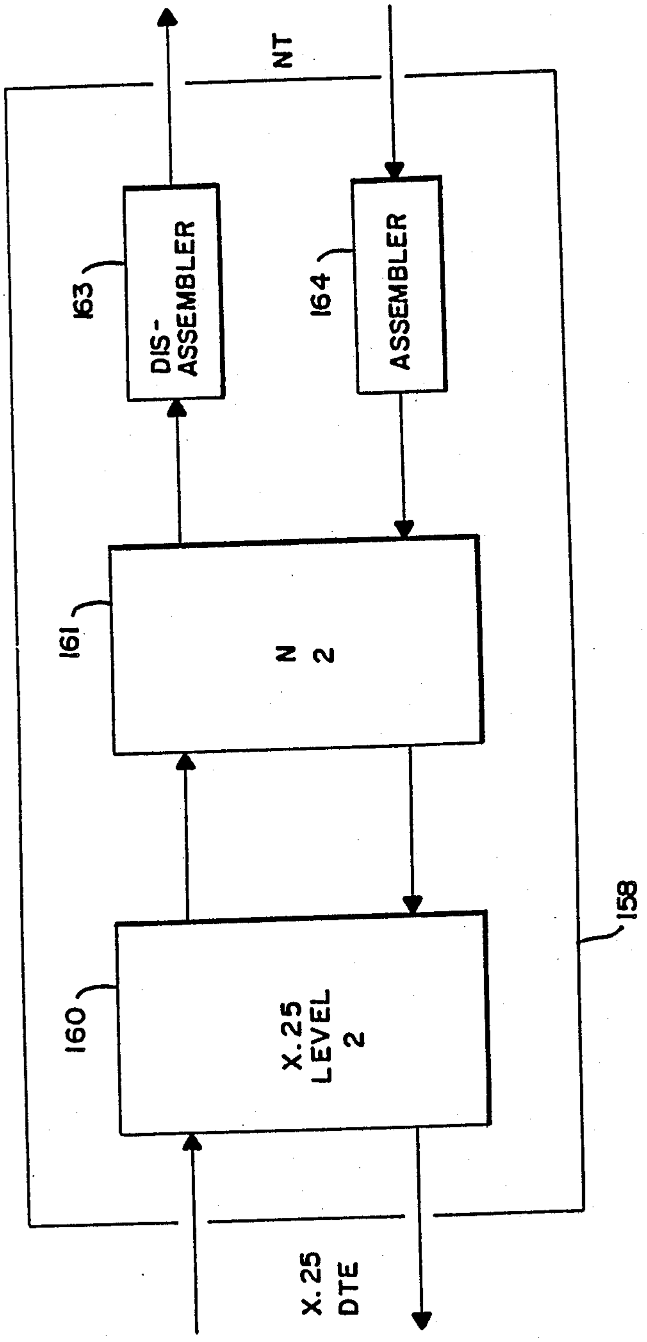
FIG. 3.8

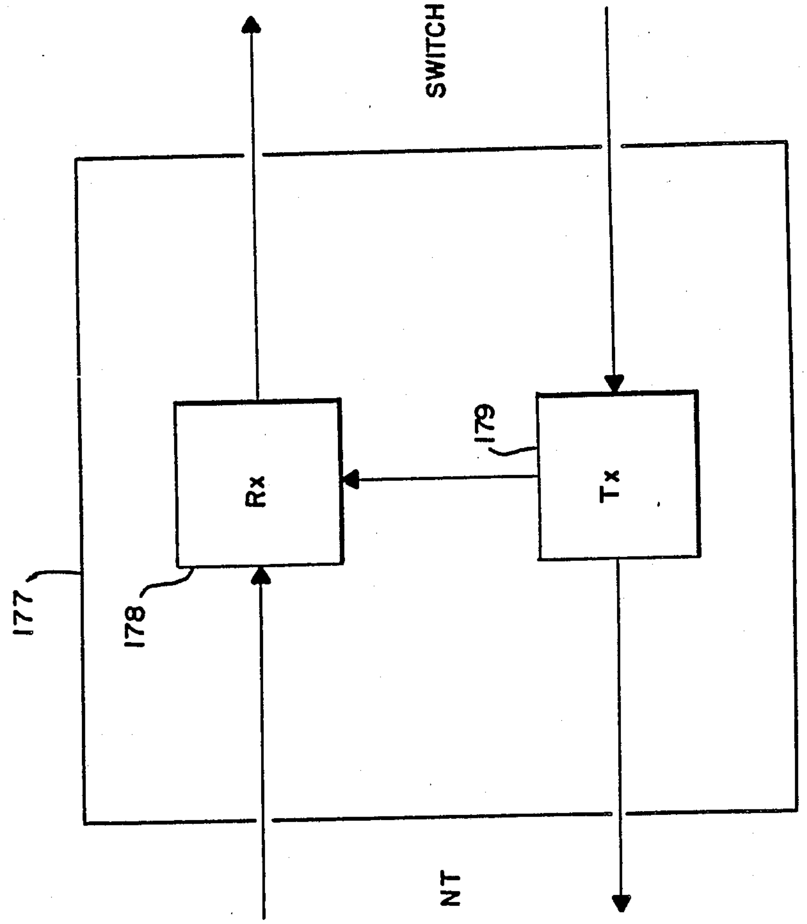
FIG. 3.10

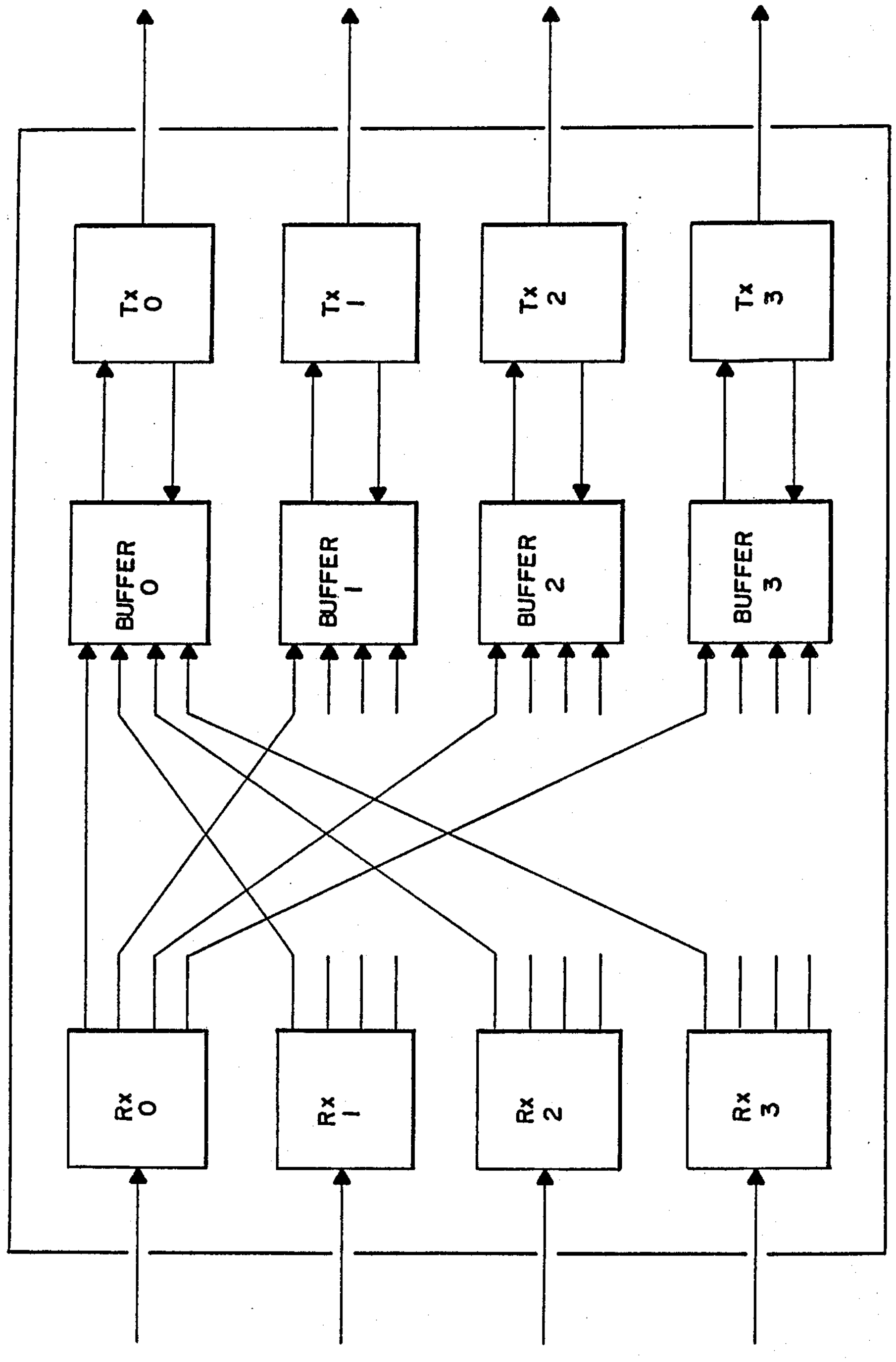
FIG. 3.11

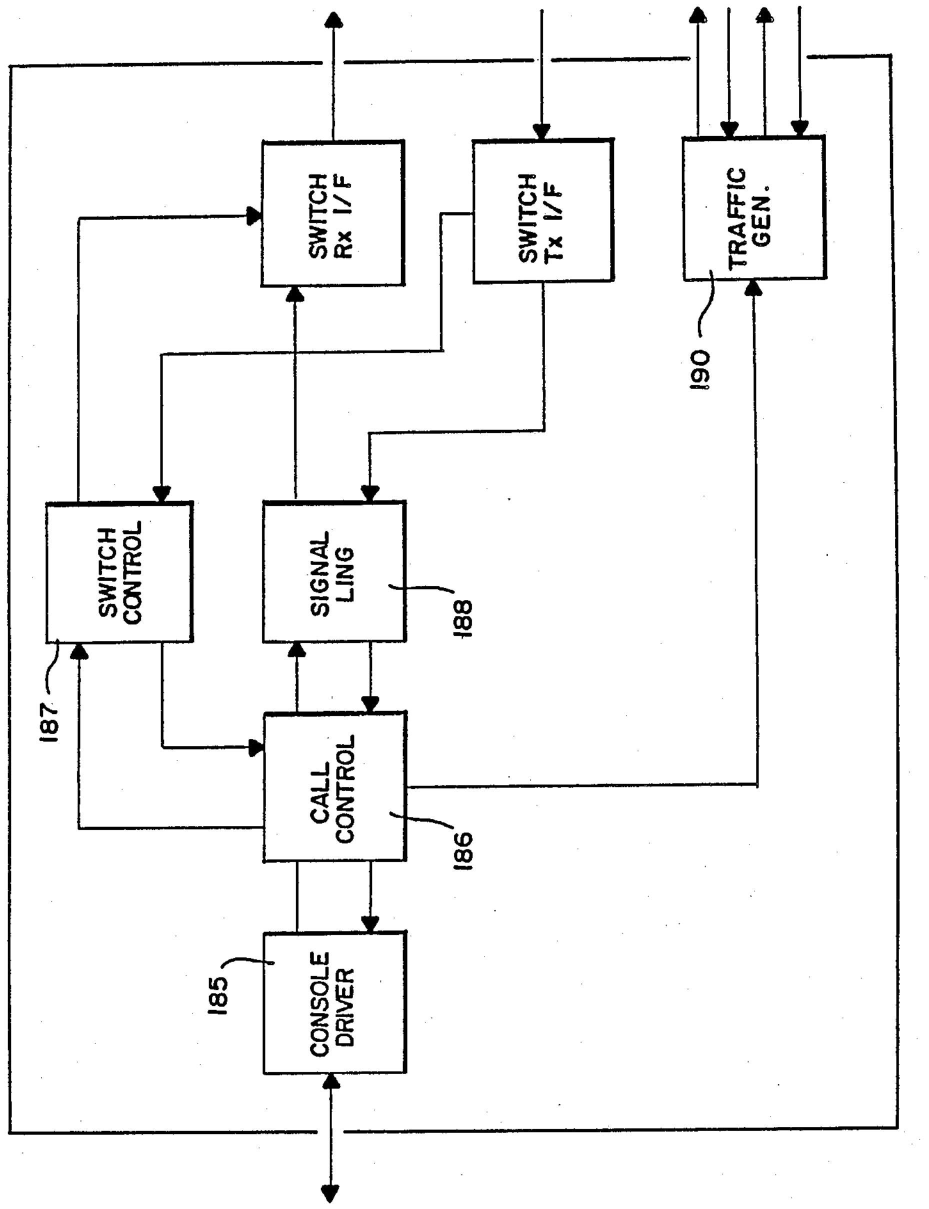
FIG. 3.12

DATA PACKET SWITCHING

BACKGROUND OF THE INVENTION

The present invention relates to switching of packets of data, and in particular to the switching of such data packets by means of a packet switch between digital subscriber or trunk lines.

Normally an interface between a group of subscriber lines and a trunk line comprises a packet switch which includes a plurality of subscriber line cards. Each card accepts data from a number of subscriber lines, usually in the form of X.25 packets, and may convert the data into smaller packets with appropriate protocols and codes for routing around the packet switch. It is often necessary to route the packets thus formed to another card for transmittal to an output port. Usually a single data bus is provided (for example, the "Multibus" or "VME") interconnecting the line interface cards, but this raises the problem of unreliability, since if one card fails, then the data bus will also fail. One solution to this is the use of a second bus in parallel with the first bus, but although this reduces the problem of bus failure, it does not eliminate the problem. A further problem is that of growth of the system, since as the number of subscribers and hence line interface cards grows, the traffic across the bus may increase to exceed the bus capacity.

SUMMARY OF THE INVENTION

To overcome these problems, the present invention provides a telecommunications packet switch comprising a plurality of line processor modules or line processing units (LPUs), for example subscriber line interface cards, in a fast packet switching system. Each LPU is coupled to a plurality of subscriber lines and/or trunk lines for accepting and transmitting packets of data. However, a major problem in the design of packet switching and/or data concentrator systems is the interconnection of LPUs. Parallel and serial bus interconnects require complex arbitration schemes to control access, duplication to provide redundancy, and have an upper limit on their capacity determined by their bandwidth and the number of LPUs requiring access at any instant of time. According to the present invention, each LPU is provided with a plurality of duplex serial links which can be connected in a point to point manner to other LPUs. The interconnect can be of a structured or a random format, but should always provide a number of different routes between LPUs. In this way, single link failures will not be catastrophic. As more LPUs are added, more links are connected, thus increasing the capacity for information transfer. Moreover, point to point links are easy to terminate, reduce crosstalk, and are readily connected between different shelves and cabinets of a system.

A preferred method of implementing this scheme is to use transputer (high speed microprocessor with I/O direct memory access lines, on-board random access memory, and programmable memory controller) serial links for the interconnect. Information is then transferred between links as short packets overlaid on the transputer's own link transfer protocol. According to the presently preferred embodiment of the invention, each LPU comprises a transputer connected to a common memory shared with line interface coprocessors. Information to be transferred is allocated a buffer space in the common memory, and then a call is set up between source and destination LPUs via free point to point links. Data is then transferred as short packets on a point by point basis between LPUs from the source LPU to the destination LPU.

In view of the high performance capability of the transputers, the routing of communication links across a chain of transputers does not significantly add to the processing load of the system. Thus, it is possible to avoid the use of conventional bus structures with attendant problems of reliability and restricted growth capability. Since in accordance with the invention, communication between two line processing units can be established via any possible route of the transputer network, there is a very high upper limit on data traffic flow and no risk of system failure should one transputer become inoperative.

Objects of the present invention include fast packet switching (asynchronous time division, or ATD, switching) with high packet throughput (32,000 packets per second), simple system expansion (up to 512 ports), and systematic degradation in the event of failure The technique for interconnection of a large number of LPUs is a significant issue in the attainment of these objectives. Among the methods of interconnection considered were parallel bus, serial bus, and point-to-point links. Parallel bus is a popular interconnection technique in packet switching products, and is a multiple bus architecture with which the desired data rate is achievable. The technique, however, requires duplication for purposes of redundancy, and raises design problems when taken over several shelves of a cabinet. Serial buses have achieved a degree of popularity with the advent of VLSI (very large scale integrated) support chips such as Ethernet controllers, and offer advantages of ease of connection, lack of complex backplanes, and ability to communicate between separate units.

In the point-to-point serial link method, the LPUs are interconnected by high speed bidirectional serial point to point links. Redundancy is provided by allowing multiple routing choices between nodes, and among its advantages, the system provides an interconnect bandwidth potentially proportional to the number of LPUs. Point-to-point serial link interconnection is employed in the present invention for several reasons, among which: link failures are not catastrophic; each LPU added to the switch adds extra links which increase the switch bandwidth; and point to point are easy to terminate and, because they are differential, serve to minimize crosstalk. Nevertheless, various problems are encountered in the implementation, including link interconnect topology, latency, routing and reconfiguration, and intercard protocols.

In the implementation of the technique, an LPU is provided which comprises a single printed circuit board or electronic card having an INMOS T414 transputer and Motorola X25 protocol controllers (XPCs). This card is referred to herein as an X25 Input/Output Processor (IOP). The transputer is a high speed, high performance 32-bit microprocessor (10 Mips) with conventional bus structure, and additionally having four serial I/O direct memory access (DMA) lines, 2 K-byte on-board RAM, and hardware-programmable memory controller. Characteristics which make the transputer desirable for the X25 IOP include high speed microprocessor with necessary hardware and software support, serial links providing a simple solution in silicon to point-to-point serial links, and high level programming language (Occam) for concurrent processing which avoids the need for an operating system. It will be appreciated that other devices having similar characteristics and features may be substituted for the T414 transputer.

The Occam language associated with the transputer simplifies the task of concurrent programming. In that the program is constructed as a number of processes declared to run sequentially or concurrently. Concurrent processes communicate across Occam channels, and if more than one transputer is available the channels may be mapped onto the transputer links, thereby allowing processes to run on different transputers.

The fast packet ATD switching technique employed in the present invention transmits and switches information in small packets, and is similar to conventional packet switching in the use of packetized information and statistical multiplexing. The two differ, however, in that conventional packet switching typically employs a complicated protocol involving considerable processing which results in comparatively long end to end delays, whereas the fast packet ATD switching utilizes a simple protocol with minimal processing and consequent minimal end to end delay. In the preferred embodiment of the invention, the fast packet system is based on SYCOMORE switch nodal structure, although other RACE structures, such as PRELUDE, may alternatively be employed. The fast packet technique is distinguishable from synchronous time division in that, among other things, the use of a time slot with fixed intervals to identify a channel is replaced by the use of a channel number in the header, and the information block length may be variable.

Additional advantages of fast packet switching include the capability to integrate voice, data, and video information services because of the availability of a wide variety of channel bit rates; a common switching network may be used for all bit rates; and the avoidance of a need to synchronize the network, with concomitant improvement of instantaneous efficiency of transmission links by their simultaneous use for channels having significantly different bit rates. As with other types, this type of switching does have some disadvantages; however, they are relatively few, principally that voice requires 2 ms to assemble a 16-byte packet which can produce delays if the subscriber goes in and out of the network with great frequency, the packet header must be of small size to avoid impacting system bandwidth, some delay and losses for non-deterministic traffic may occur because queues are used to solve contention problems, and control is desirable to assure that subscribers do not exceed the allowable bit rate and thereby incur delay and losses.

BRIEF DESCRIPTION OF THE DRAWINGS

The above and still further objects, features and attendant advantages of the invention will become apparent from a consideration of the following detailed description of a preferred embodiment thereof, taken in conjunction with the accompanying drawings, in which:

FIGS. 3.1 to 3.12 are block diagrams of a specific implementation of the preferred embodiment, and include a representation of a short packet.

DETAILED DESCRIPTION OF A PREFERRED EMBODIMENT

Figure 1:
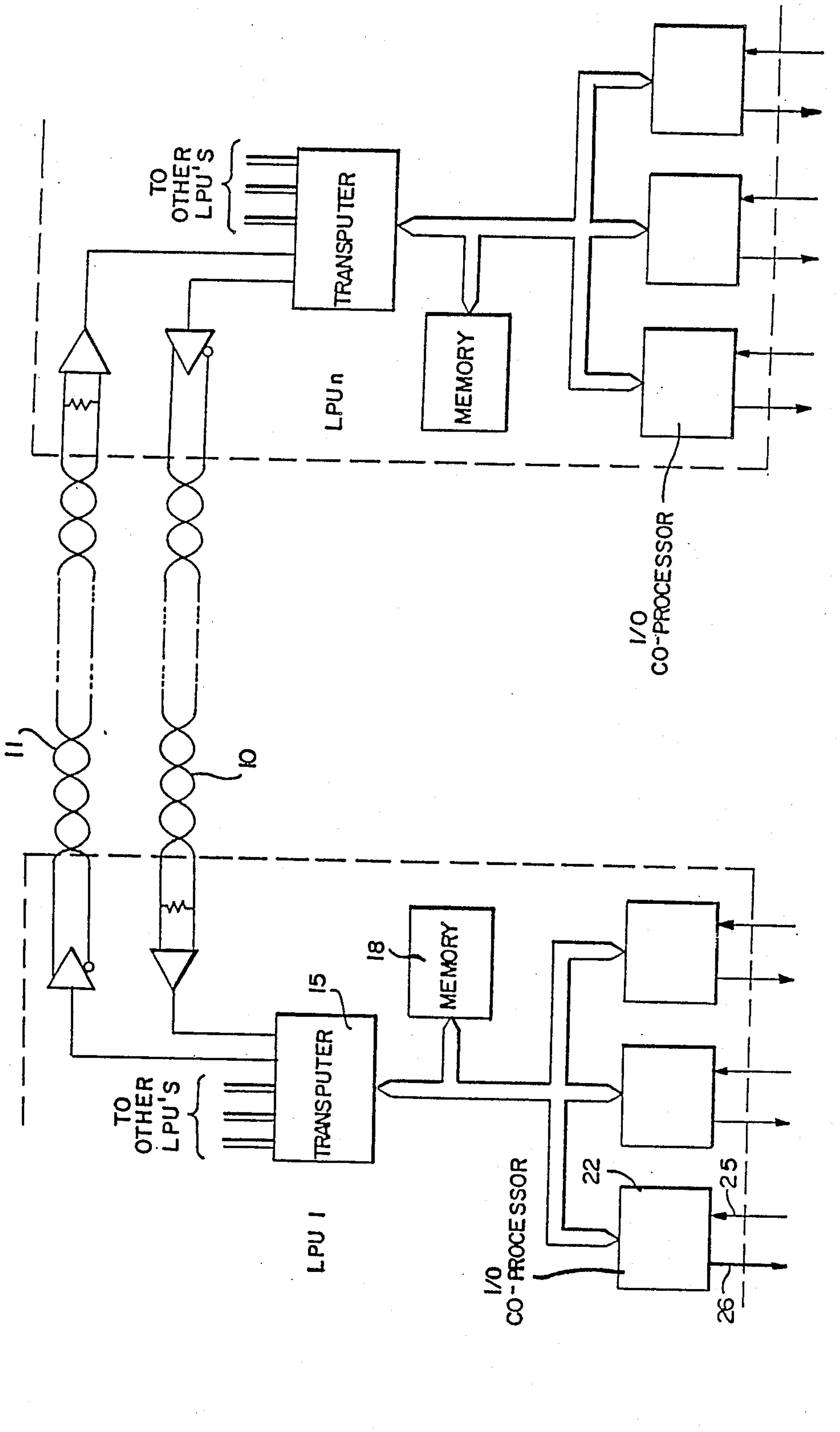
FIGS. 1 and 2 are block diagrams of a generalized version of the presently preferred embodiment.

Referring now to FIG. 1 of the drawings, a preferred implementation of the invention for use in a packet switch or data concentrator includes a plurality of LPUs 1, . . . , n interconnected in a point to point manner by a number of duplex serial communication links. By way of example, a set of duplex serial links 10, 11 is shown interconnecting LPU 1 and LPU n for communication in either direction between the two LPUs, but it will be understood that a number of serial links are provided for interconnection of all of the LPUs in any structured or random format. Each LPU comprises a transputer such as transputer 15 of LPU 1, together with on-board memory 18, and a number of input/output (I/O) devices such as, in LPU 1, I/O co-processors 22 With associated input and output ports 25, 26.

Figure 2:
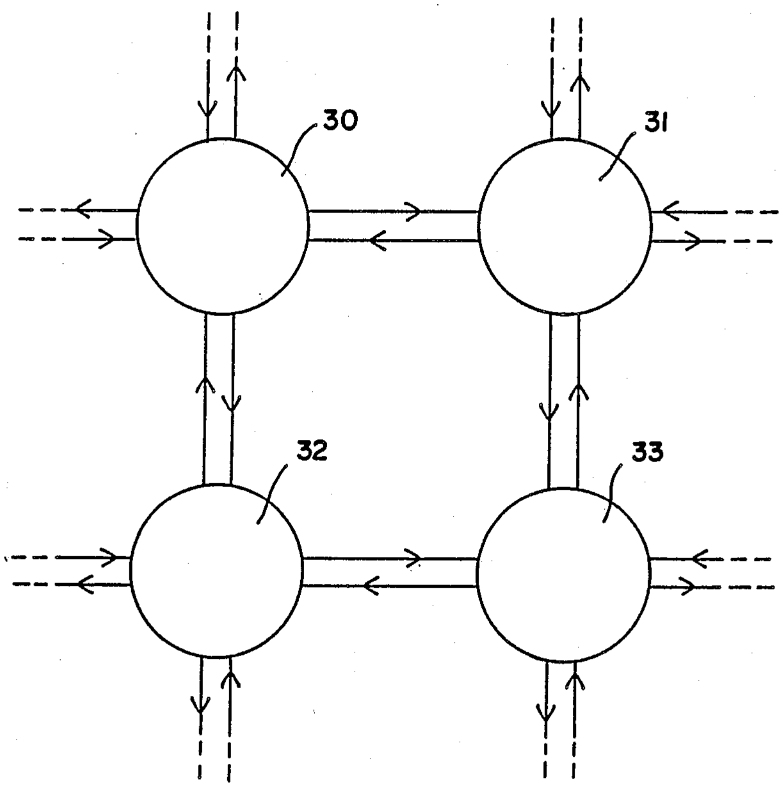
Figure 39:
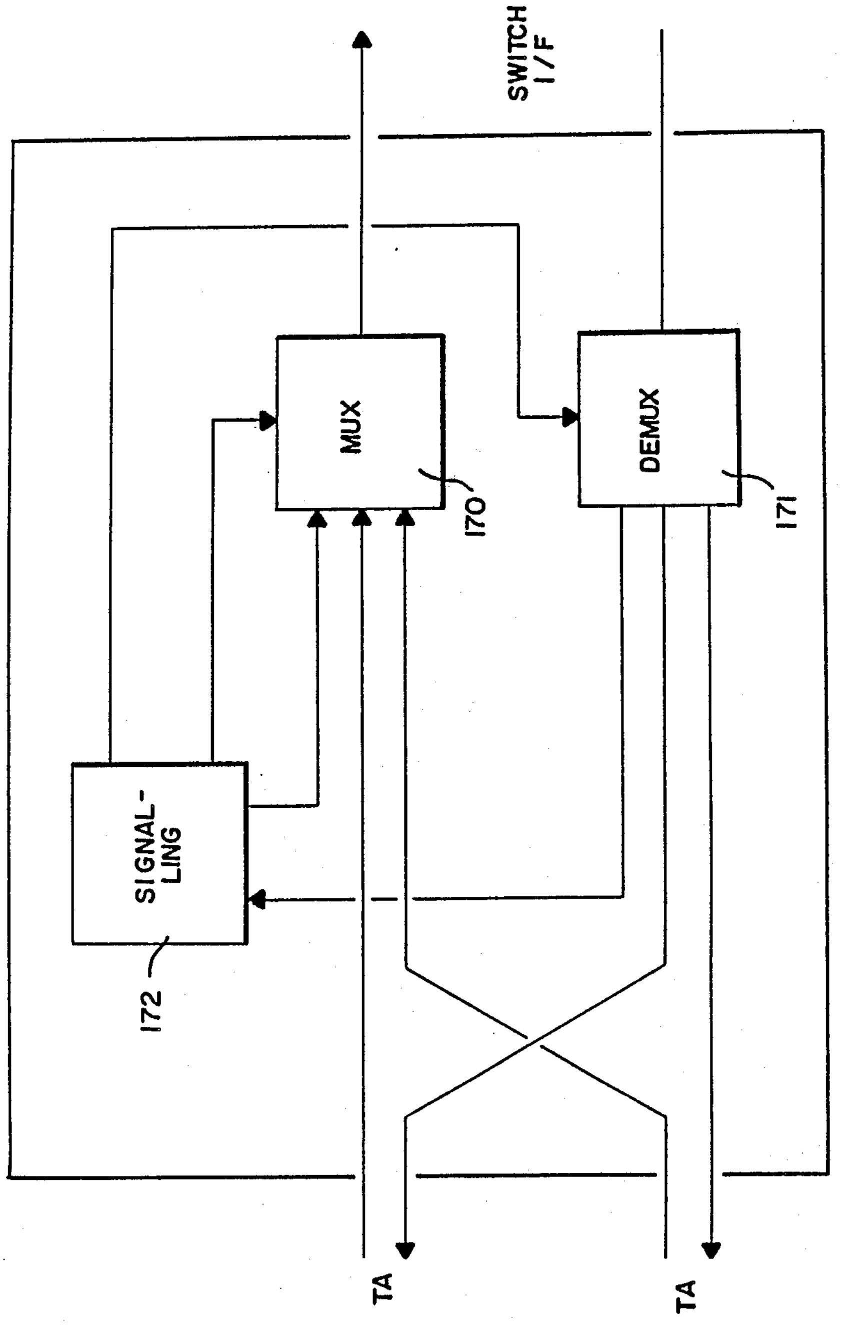

FIG. 2 illustrates a network of serial point to point interconnects in which LPUs 30, 31, 32, 33 are interconnected in a point to point manner to each other by means of duplex serial input and output links in a matrix architecture.

A presently preferred specific embodiment of the hardware portion of a fast packet ATD switching system according to the present invention is shown in block diagrammatic form in FIG. 3.1. The five principal functional segments of the system include terminal adaptors 61, 62, 63, 64; network terminations 67, 68; switch interfaces (switch I/Fs, or SIFs) 70, 71; switch 73: and switch control and signalling function 75. Each of the terminal adaptors 61, 62, 63, 64 handles one physical port, and forms an interface between the subscriber equipment and communication protocol (for example, X.25 and voice) and the network fast packet protocol. Information is exchanged between the terminal adaptor function and the network termination in the form of a data packet (or split or short data packet, any of these various forms of data transfer units being referred to herein as a cell). Each network termination 67, 68 provides the interface between its respective terminal adaptors and the fast packet network, handling the multiplexing and demultiplexing from the network of fast packet data cells under the control of tables set up by the control and signalling function 75 when a call is established. The tables effect a translation between the physical port number and a logical slot number unique to the particular call. As shown in FIGS. 3.3, the slot number occupies a byte in the header of the cell format.

Each switch I/F function 70, 71 (FIG. 3.1) interfaces a respective particular network termination 67, 68 to the switch 73, controlling the routing by appending a single-byte destination ID to the cell which is then used by the switch 73 to route that cell to the required output. The translation between source slot number and destination slot number and destination ID for a particular cell (that is, a call) is controlled by a control table which is set up by the switch control function 75. The switch 73 includes a plurality of switch elements 77-1, . . . , 77-n, . . . , n-1, . . . , n-n, connected in a two-dimensional matrix as shown in FIG. 3.2, with the switch I/F functions around the periphery. Each switch element has four bi-directional serial links: for example, 81, 82, 83, 84 in the case of switch element 77-1. Routing of cells between the switch elements is effected by the destination ID in the cell header and a fixed routing table unique to each switch element.

All call connections in the fast packet ATD switching system ar established and disconnected by the user via the switch control and signalling functions 75 (FIG. 3.1). In the case of signalling information. The information is exchanged between the signalling function and the various network terminations. In that respect, although only two network terminations (and associated numbers of terminal adaptors and switch I/Fs) are shown in FIG. 3.1, it will be understood that a greater number of such functions may be utilized in practice. Switch control information is exchanged between the switch control function and the various switch I/F functions. A reserved SC bit in the destination ID byte of the cell header (see FIG. 3.3) is used to identify switch control cells, because the latter cells use the same paths through the switch as the signalling and data cells.

The hardware configuration of the fast packet ATD switching system is shown in block diagrammatic form in FIG. 3.4. In the prototype system which was implemented to demonstrate the principles of the invention, a mesh network of transputer links was utilized to provide the physical connections and software switching to mimic the operation of self routing fast packets. Analogue telephone interfaces were used to provide digitized voice for the prototype via INMOS link adaptors. Those skilled in the art to which the invention pertains will recognize and appreciate that other elements may be substituted to provide the desired functions in practicing the invention. In FIG. 3.4, a card B002 implements the switch control and signalling functions of the fast packet ATD switching system. This card has a single T414 32-bit transputer with 1-megabyte of parity-protected dynamic RAM, four INMOS serial link connections, and two RS232 ports. A VDU connected to one of the RS232 ports provides the user with a control means for the system.

A second card, INMOS B003, has four T414 transputers 91, 92, 93, 94, each with 256 K-bytes of local dynamic RAM. Each of these transputers uses two of its INMOS links to talk to the other transputers on the card, such that the transputers are connected in a square. The other two links of each transputer are thereby available for off-card communication. Two transputers (91 and 92) are used to implement the switch function, each acting as a switch element: and each of the remaining two transputers (93 and 94) implement the terminal adaptor (TA), network termination (NT), and switch interface (SIF) functions for two voice ports, and is connected to a respective analogue telephone interface card 96, 97. The analogue telephone interface cards are application-specific with dual ports to connect the fast packet ATD switching system to four analogue telephones.

Referring to FIG. 3.5, which is a block diagram showing one port of the dual-port interface card (either card 96 or card 97), a two-wire analogue telephone line 101 is connected via a hybrid circuit (not shown) to the full duplex analogue connections of a CODEC (coder/decoder) 102. In the prototype system, the CODEC 102 was implemented using a Plessey MV3506 PCM A-law CODEC. Received PCM data is clocked at a serial rate of 64 KBPS into an RX FIFO (first-in first-out) memory 104, while PCM data to be transmItted is clocked out of a TX FIFO memory 105 at the same rate into the CODEC 102.

Each of the FIFO memories is 32 bytes long and one byte wide. All clocks on the card, with the exception of that supplying the INMOS link adaptor 107, are derived from a base crystal oscillator of 4.0 MHz so that the system is synchronous. The FIFO memories are used for serial to parallel conversion of the data, in addition to providing buffering between the CODEC 102 and the INMOS link adaptor 107. Additional conventional circuitry (not shown) is provided to maintain byte synchronization between the FIFO memories 104, 105 and CODEC 102 in the event that either the RX FIFO 104 becomes full or the TX FIFO 105 empties. Both of these conditions arise on start-up of the fast packet ATD switching system. Simple handshake signals enable byte-wide communication between the FIFOs 104, 105 and the link adaptor 107.

The INMOS serial link to the terminal adaptor (TA) has a data rate of 10 MBPS, and carries data synchronously one byte at a time. Each byte is acknowledged from the far end on the return link. When the system is running, the terminal adaptors continuously sample the received data, whether or not the call is connected. Consequently, the RX FIFO memory 104 never contains more than a single byte at a time. However, data directed to the transmit side from the terminal adaptor, once a call has been established, arrives as a burst of 16 bytes at 10 MBPS. Such a burst causes the TX FIFO memory 105 to become half full, which may be observed by an LED (light emitting diode, not shown) connected to the half full flag output of the memory. This condition only arises when the system is set to zero delay.

Returning now to FIG. 3.4, the system includes two X.25 input/output processor (IOP) cards, designated X25 IOP A and X25 IOP B. In the prototype, each of these cards was a multilayer POB using a combination of conventional and surface mounting technologies, and PAL (programmable array logic) devices to reduce the device count. The on-board CPU for each card is, in the preferred embodiment, a T414-15 32-bit transputer (110 on card A, 111 on card B), with local memory of 256 K-bytes of parity-protected dynamic RAM, 128 K-bytes of EPROM, and 256 K-bytes of CMOS static RAM. All four of the transputer INMOS serial links are taken off-card. The X.25 ports on each X.25 IOP card are provided by four X.25 protocol controllers (XPCs, designated X25 I/F in FIG. 3.4) (113, 114, 115, 116 on card A), implemented as integrated circuit chips. The XPCs implement all of the major functions of X.25 level 2 and may be regarded as peripheral processors to the main CPU.

Details of each X.25 IOP card are shown in the block diagram of FIG. 3.6. The transputer 110 has four serial links 119. The associated DRAM 120 and EPROM/SRAM 121 are accessed via local bus 123. Communication between the onboard CPU (transputer 110) and the XPCs 113–116 is accomplished by means of control registers (not shown) in each XPC, addressable from the CPU, and via shared data structures in the XPC 256 K-byte static RAM bank 125. This RAM is arranged to be accessed by the XPCs 16 bits wide and by the transputer 32 bits wide. Arbitration between the transputer 10, an Ethernet co-processor 126, and the four XPCs 113–116 for the multiple-master I/O bus 128 is controlled by a bus arbiter 130, with the transputer being given priority. The reason for such a split between the local and I/O buses is to maximize the performance of the transputer under high traffic conditions by introducing a degree of parallelism into the system.

An 8-bit peripheral bus 131 entirely under the control of transputer 110 contains a dual UART (universal asynchronous receiver transmitter) 133 with two RS232 ports, a single digit hexadecimal display 134, a real time clock with battery-backed RAM (2 K bytes) 135, a hexadecimal switch input port 136, an interrupt controller 137, and six programmable timers 138 used for baud rate generation and software watchdog timer.

The software for the fast packet ATD switching system of the present invention is also reflected in FIG. 3.1, discussed above. All the software in the prototype system representing the presently preferred embodiment is written in the Occam 2 programming language. The programming environment is a combined editor/compiler referred to as the transputer development system (component 140 of FIG. 3.4) running on an IBM PC/AT with an internal INMOS B004 transputer card. The fast packet ATD switching system is connected to this development system by a single INMOS serial link. Once the software has been compiled and configured for the target network, it may be down-loaded into the switching system.

A block diagram of the analogue telephone terminal adaptor function is illustrated in FIG. 3.7, useful in explaining that portion of the system software. Received data at the terminal adaptor 148 from the analogue telephone interface is DMAed (direct memory accessed) into a 16 byte cell data field in an RX (receiver) process (150), and the cell then passed to the network termination. This process is repeated continuously, whether or not the call is connected. A seven bit sequence number is written into the control field of each cell, and is used by the remote terminal adaptor to identify missing cells. The receiver also carries out silence detection, in that cells which contain silence data are not passed to the network termination.

Cells to be transmitted are passed from the network termination to the terminal adaptor 148, and are then queued in the buffer process (151) until a request for one is made by the TX (transmitter) process (152). The TX process then accepts a cell and DMAs its 16 byte data field out to the link controller on the analogue telephone interface card (see FIG. 3.5). A delay may be introduced into a call by setting a threshold in the buffer process (151) at call connect time, to inhibit buffer outputs until a predetermined number of cells have been received from the network termination.

A block diagram for explaining the software function of the X.25 terminal adaptor is shown in FIG. 3.8. The X.25 DTE (data terminal equipment) is connected to the X.25 terminal adaptor 158 of the system via a combined hardware/ software interface, consisting of the XPC chip and a software driver. Together, these functions implement X.25 level 2 (160). This protocol level is responsible for X.25 link-level functions between the X.25 DTE and the terminal adaptor only. The N2 protocol level (161) implements a protocol between the local terminal adaptor and the remote terminal adaptor at the other side of the fast packet network, and has responsibilities including flow control, error detection, and retransmission. Because X.25 packets are of variable length (up to 4 K bytes), they must be disassembled into 16 byte cells before being sent to the network termination. In the opposite direction, cells must be reassembled into packets. These functions are implemented by the disassembler process and assembler process (163 and 164), respectively. The information to synchronize packet splitting and combining correctly is encoded in the cell control field of the header (see FIG. 3.3) by the disassembler 163 as a sequence number and a bit to indicate the last cell in a packet. This data is then read by the assembler 164.

Referring no to FIG. 3.9, in the network termination software function, cells from a particular terminal adaptor are multiplexed (170) onto a single upstream connection to the switch interface. For that purpose, a translation from port (i.e., terminal adaptor) number to logical slot number must be performed to identify each cell received at the switch interface with a particular call. Such a translation is carried out via the RX connection table within the multiplex process. If a particular terminal adaptor is marked as "not connected", then the cells received from that terminal adaptor are discarded. The demultiplex process (171) holds the corresponding TX connection table, which translates the slot numbers of transmit cells from the switch interface into physical port (terminal adaptor) numbers. Here again, if a slot is marked in the table as "not connected", the cells with that slot number will be discarded. Cells with connected slot numbers (in the respective table) are sent to their appropriate terminal adaptors.

Slot 0 and Port 0 are reserved for the exchange of signalling information. Cells received at the demultiplex process with slot 0 are sent to the signalling process (172). Encoded within the data field of a signalling cell is a command to the signalling process, with the required parameters. The types of commands include Type 00 (Echo), a diagnostic command which echoes the signalling cell back to the signalling function; Type 01 (TA Connect), which causes the TX and RX connection tables in the multiplex and demultiplex processes to be updated to connect a particular port to a particular slot; and Type 02 (TA Disconnect), which has the opposite effect to the Type 01 command. Once a command has been actioned, a response is sent back to the signalling function. The response cell is regarded by the multiplex process as if it were a received cell from the reserved port 0. This port is permanently connected to slot 0 by the TX connection table.

By way of explanation of the software function of the switch interface, reference is made to FIG. 3.10. Cells received from the network termination (NT) by the switch interface 177 are subjected to the RX process (178), where their slot numbers are used to index the control table. Slots marked in the table as "not connected" cause the respective cell to be discarded. If the slot is indicated as connected, the cell slot number is replaced by the outgoing slot number held in the table. The table also supplies the destination ID, which is appended to the cell header so as to route that cell through the switch.

Cells sent by the switch to the switch interface are handled by the TX process (179). The destination ID is examined for the SC (switch control) bit, and, if not present. The destination ID is stripped and the cell is sent to the network termination. However, if the SC bit is present, then the destination ID is set to zero and the entire cell, including the ID, is sent to the RX process (178). A cell of this type is regarded by the RX as switch control information, with its data field containing a command and appropriate parameters. Three types of switch control commands can be sent to the switch interface, viz., Type 00 (Echo). which causes the cell to be echoed back to the switch control function: Type 01 (control write). which causes an update in the control table entry for a particular slot number of the connect status, the outgoing slot number, and the destination ID; and Type 02 (control read), which causes the control table entry for a particular slot number to be returned to the switch control function. Once a command has been actioned, a response is sent back to the switch control function.

FIG. 3.11 is a block diagram of a single switch element of the type which has been described above. A received cell, which may be from a switch interface or another element of the system, is input by the RX process connected to that physical INMOS link (0, 1, 2, or 3). The destination ID of the cell is used to index a fixed routing table, unique to each switch element, to find the required output link for that cell. Each output link has an associated four cell deep FIFO buffer (0, 1, 2, 3), which is required in the event that more than one cell requires the same output link. The appropriately routed cell is then outputted via the associated TX process (0, 1, 2, or 3).

The block diagram for describing the software functions of the control and signalling function of the fast packet ATD switching system of FIG. 3.1 is presented in FIG. 3.12. A consoloe driver process (185) drives the RS232 hardware of the B002 card (FIG. 3.4), and has an interface to the call control process (186) in the form of ASCII characters. The call control inputs commands entered at the VDU which fall into three groups. Low level commands are used for writing to individual tables in the terminal adaptors and the switch interfaces; high level commands for setting up and clearing down calls; and diagnostic commands for validating the network connections and testing new software. The required action of any of these commands is to send one or more signalling and/or switch control commands of the three types referenced above for the network termination and switch interface functions (Types 00, 01, 02). The functions are carried out by the switch control and signalling processes (187 and 188), under the control of intermediate commands and status blocks from the call control process (186). The switch connections are set for the signalling paths for communication with the required network terminations.

A software traffic generator was included in the prototype system to simulate the effect of X.25 data. Commands available at the system VDU cause the traffic generator process (190) to send sequences of cells at controlled intervals to two independent ports, which simulate the switch interfaces of the two X.25 IOPs (FIG. 3.4). The number of cells in a sequence was programmable for each port and simulates the way in which an X.25 packet will be sent into the network after being split up into cells by the X.25 terminal adaptor, as described above. The interval between sequences was also programmable for each port in intervals of 100 us, which is proportional to the simulated X.25 port packet rate.

As simulated traffic was increased beyond a predetermined point, the switch elements became overloaded because of requirements imposed on the single INMOS link between the two switch elements (FIG. 3.4). The effect of this overload is to cause the FIFO buffers (FIG. 3.11) associated with the two transmit ends of that link to overflow, with the result that some cells are lost. Lost cells will cause gaps in the stream of cells to be transmitted at the terminal adaptor. The effect of such loss is minimized in the case of voice data by replacing the lost data with the PCM code for silence, which removes "clicks" associated with the missing data, but some speech distortion is noticeable. Silence insertion is achieved by using the sequence number of the cell to address the analogue telephone terminal adaptor's transmit buffer instead of using an incrementing input pointer. When the transmit process reads a new cell from the buffer, it writes silence data to the location in the buffer that has just been read, before incrementing the output pointer. In this manner, any missing cells in the sequence are replaced by silence.

The capacity of the system can be increased if cells are sent to the network from the analogue telephone terminal adaptor only when the cells are not silence data. Silence detection may be achieved by a mean amplitude detection process in which the data sample bytes for a cell are all treated a positively-signed. If the sum of these values is below a preselected value the cell is regarded as silence.

It will be appreciated that the principle of fast packet switching relies upon a high bandwidth asynchronous switch, the throughput of which is much greater than the average traffic connected through it. The switch consists of a number of simple switching elements, which are designed to offer minimum delay to the data cells. The presently preferred embodiment of the invention implements a matrix switch configuration, in which each switch element has a four cell deep FIFO buffer on each of its four output links. The switch elements themselves route switch control cells to the switch interfaces, these cells being recognized by a special bit in their destination ID bytes. Such a system has the advantage, among others, of doing away with an expensive switch control plane. Although a matrix switch is employed for the sake of simplicity, other architectures such as delta networks may alternatively be employed.

Accordingly, although a presently preferred embodiment of the invention has been described herein, it will be recognized by those skilled in the relevant art that variations and modifications of the preferred embodiment may be implemented without departing from the true spirit and scope of the invention. It is therefore intended that the invention shall be limited only to the extent required by the appended claims and the applicable rules of law.

What is claimed is:

1. A packet switch for a fast packet asynchronous time division switching system, the fast packet switching generating switch control cells in the form of short data packets containing control information and message information, said system including a high bandwidth asynchronous switch having a throughput substantially greater than the average traffic connected through it; said high bandwidth asynchronous switch comprising a plurality of switching elements, means for providing minimum delay to the data packets being switched therethrough, means for connecting the switching elements in a point-to-point matrix switch configuration, said connecting means including multiple duplex serial links for each switching element for transmitting and receiving data packets to and from the other switching elements in the matrix, switch interface means for tagging the control information of said switch control cells with a destination ID byte including a special bit, said switching elements further including means for recognizing said special bit, and means responsive to recognition of the special bit for routing said switch control cells through the matrix from a source switching element to a destination element along the point-to-point links.

2. The packet switch according to claim 1, wherein each of the duplex serial links of the switching elements include an input link and an output link, and each switching element further includes a multiple-cell deep first-in first-out buffer on each of its multiple output links.

3. The packet switch according to claim 2, wherein the duplex serial links of the switching elements are connected point to point by said serial links, whereby each switching element is connected to the other switching elements of said matrix to permit passage of data packets between the switching elements via redundant paths.

4. The packet switch according to claim 3, wherein the switching elements are line processing units.

5. The packet switch according to claim 3, wherein the switching elements are transputers.

* * * * *